United States Patent
Nakashima et al.

(10) Patent No.: US 12,123,566 B2
(45) Date of Patent: Oct. 22, 2024

(54) LIGHTING CONTROLLER FOR VEHICULAR LAMP, VEHICULAR LAMP SYSTEM

(71) Applicant: Stanley Electric Co., Ltd., Tokyo (JP)

(72) Inventors: Wataru Nakashima, Tokyo (JP); Yasushi Kita, Tokyo (JP); Takako Kimura, Tokyo (JP); Kouki Kudo, Tokyo (JP); Akihisa Kumakura, Tokyo (JP); Hidetaka Okada, Tokyo (JP); Shuto Oyama, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 51 days.

(21) Appl. No.: 17/642,705

(22) PCT Filed: Sep. 28, 2020

(86) PCT No.: PCT/JP2020/036654
§ 371 (c)(1),
(2) Date: Mar. 14, 2022

(87) PCT Pub. No.: WO2021/065806
PCT Pub. Date: Apr. 8, 2021

(65) Prior Publication Data
US 2022/0325866 A1    Oct. 13, 2022

(30) Foreign Application Priority Data
Sep. 30, 2019    (JP) .................................. 2019-178399

(51) Int. Cl.
*F21S 41/663*    (2018.01)
(52) U.S. Cl.
CPC .................................. *F21S 41/663* (2018.01)

(58) Field of Classification Search
CPC ........ F21S 43/15; F21S 41/663; F21S 41/151; F21S 41/153
See application file for complete search history.

(56) References Cited

U.S. PATENT DOCUMENTS

| 4,556,862 A | 12/1985 | Meinershagen |
| 6,133,852 A | 10/2000 | Tonkin |

(Continued)

FOREIGN PATENT DOCUMENTS

| DE | 102015114632 A1 | 3/2017 |
| EP | 2000356 A1 | 12/2008 |

(Continued)

OTHER PUBLICATIONS

West Coast Classic Cougar, "Plasma LED's and the '69-73 Cougar Sequential Turn Signal System", https://www.youtube.com/watch?v=8Yuak3g-TcA, 3:00-3:45, published Jun. 23, 2016 by Youtube.com (Year: 2016).*

(Continued)

*Primary Examiner* — Matthew J. Peerce
(74) *Attorney, Agent, or Firm* — XSENSUS LLP

(57) ABSTRACT

To reduce a sense of discomfort during sequential blinking. A lighting controller for a vehicular lamp to control lighting of the vehicular lamp, where the lighting controller is configured to control so that a light emitting region of the vehicular lamp is repeatedly lighted on and off with a first luminance and where, during the time when the light emitting region is lighted on, at a partial region of the light emitting region, one or more bright spots are set with a second luminance that is higher than the first luminance to be moved within the light emitting region, or during the time when the light emitting region is lighted on, at the partial region of the light emitting region, one or more dark spots (Continued)

are set with a third luminance that is lower than the first luminance to be moved within the light emitting region.

5 Claims, 7 Drawing Sheets

(56) References Cited

U.S. PATENT DOCUMENTS

| | | | |
|---|---|---|---|
| 9,187,031 B1* | 11/2015 | Ovenshire | B60Q 1/2696 |
| 10,780,819 B2* | 9/2020 | Hellin_Navarro | F21S 43/245 |
| 11,325,536 B2* | 5/2022 | Huizen | F21S 43/14 |
| 2010/0302020 A1 | 12/2010 | Lenneman et al. | |
| 2016/0091162 A1 | 3/2016 | Dubose | |
| 2021/0146841 A1* | 5/2021 | Huizen | B60Q 1/2665 |

FOREIGN PATENT DOCUMENTS

| | | |
|---|---|---|
| EP | 3002154 A1 | 4/2016 |
| JP | 2001-260746 A | 9/2001 |
| JP | 2002-2372 A | 1/2002 |
| JP | 2014-12493 A | 1/2014 |
| JP | 2015-33980 A | 2/2015 |
| JP | 2015-145224 A | 8/2015 |
| JP | 2016-124503 A | 7/2016 |
| JP | 2019-111856 A | 7/2019 |
| WO | 2016/001936 A2 | 1/2016 |
| WO | 2016/151664 A1 | 9/2016 |

OTHER PUBLICATIONS

International Search Report and Written Opinion mailed on Dec. 8, 2020, received for PCT Application PCT/JP2020/036654, Filed on Sep. 28, 2020, 12 pages including English Translation.

Office Action issued on May 30, 2023, in corresponding Japanese patent Application No. 2019-178399, 11 pages.

Extended European search report issued on Sep. 18, 2023, in corresponding European patent Application No. 20872567.1, 9 pages.

* cited by examiner

LIGHTING CONTROLLER FOR VEHICULAR LAMP, VEHICULAR LAMP SYSTEM

CROSS-REFERENCE TO RELATED APPLICATIONS

The present application is based on PCT filing PCT/JP2020/036654, filed Sep. 28, 2020, which claims priority to JP 2019-178399, filed Sep. 30, 2019, the entire contents of each are incorporated herein by reference.

TECHNICAL FIELD

The present invention relates to a vehicular lamp system used as a turn lamp (direction indicator lamp), for example.

BACKGROUND ART

As a type of a turn lamp used in a vehicle, there is known a plurality of light emitting units which are sequentially lighted on with a time lag (refer to Patent Document 1, for example). Here, such a lighting method is called sequential blinking. A vehicular lamp which performs such sequential blinking is controlled so as to repeat an operation in which each light emitting unit is sequentially lighted on from the inner side to the outer side of the vehicle and then all the light emitting units are lighted off at the same time, for example.

In a vehicular lamp which performs sequential blinking as described above, it gives a burden of recognizing lateral movement from the inner side to the outer side of the vehicle to a person who visually recognizes it (for example, a pedestrian or a driver of another vehicle). Thus, compared to a conventional turn lamp which simply repeats blinking, there is a possibility that a turn lamp which performs sequential blinking imposes a sense of discomfort as a direction indicator lamp.

PRIOR ART DOCUMENT

Patent Document

Patent Document 1: Japanese Unexamined Patent Application Publication No. 2015-145224

SUMMARY OF THE INVENTION

In a specific aspect, it is an object of the present invention to provide a technique capable of reducing a sense of discomfort during sequential blinking.

(1) A lighting controller for a vehicular lamp according to one aspect of the present invention is (a) a lighting controller for a vehicular lamp to control lighting of the vehicular lamp, (b) where the lighting controller is configured to control so that a light emitting region of the vehicular lamp is repeatedly lighted on and off with a first luminance, and where, during the time when the light emitting region is lighted on, at a partial region of the light emitting region, one or more bright spots are set with a second luminance that is higher than the first luminance to be moved within the light emitting region, or during the time when the light emitting region is lighted on, at the partial region of the light emitting region, one or more dark spots are set with a third luminance that is lower than the first luminance to be moved within the light emitting region.

(2) A lighting controller for a vehicular lamp according to one aspect of the present invention is (a) a lighting controller for a vehicular lamp having a plurality of light emitting units to control lighting of the vehicular lamp, (b) where the lighting controller is configured to control so that the plurality of light emitting units is repeatedly lighted on and off with a first luminance, and (c) where, within the time period in which the plurality of light emitting units is lighted on, one or more bright spots are temporarily set with a second luminance that is higher than the first luminance to at least one light emitting unit among the plurality of light emitting units to be moved in a predetermined direction, or one or more dark spots are temporarily set with a third luminance that is lower than the first luminance to at least one light emitting unit among the plurality of light emitting units to be moved in a predetermined direction.

(3) A lighting controller for a vehicular lamp according to one aspect of the present invention is (a) a lighting controller for a vehicular lamp having a plurality of first light emitting units and a plurality of second light emitting units each of which is intermittently arranged between the first light emitting units, to control lighting of the vehicular lamp, (b) where the lighting controller is configured to control so that the plurality of first light emitting units is repeatedly lighted on and off with a first luminance, and (c) where, within the time period in which the plurality of first light emitting units is lighted on, one or more bright spots are temporarily set with a second luminance that is higher than the first luminance to at least one of the second light emitting units among the plurality of second light emitting units to be moved in a predetermined direction, or one or more dark spots are temporarily set with a third luminance that is lower than the first luminance to at least one of the second light emitting units among the plurality of second light emitting units to be moved in a predetermined direction.

A vehicular lamp system according to one aspect of the present invention is a vehicular lamp system including any one of the lighting controller described above and a vehicular lamp controlled by the lighting controller.

According to the above configurations, a sense of discomfort during sequential blinking can be reduced.

MODE FOR CARRYING OUT THE INVENTION

Figure 1:
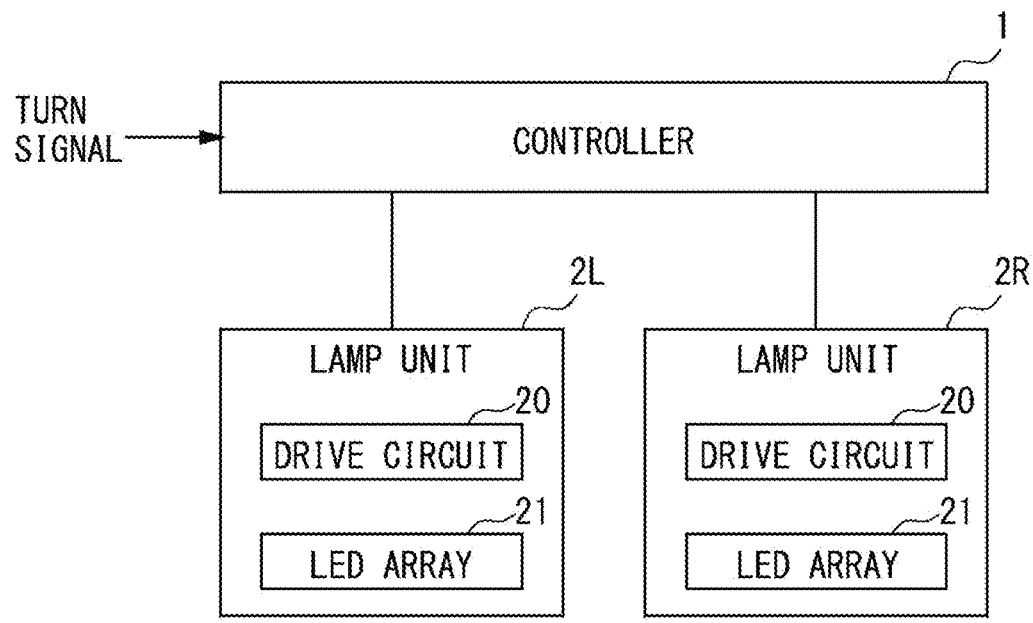
FIG. 1 is a block diagram showing a configuration of a vehicular lamp system according to one embodiment.

FIG. 1 is a block diagram showing a configuration of a vehicular lamp system according to one embodiment. The illustrated vehicular lamp system is used as a direction indicator lamp (a turn lamp), and is configured to include a controller 1 and a pair of lamp units (vehicular lamps) 2L and 2R whose operation is controlled by the controller 1, for example.

When a turn signal which indicates that the direction indicator has been operated is being input from the vehicle, the controller 1 controls the lighting state of either the lamp unit 2L or 2R according to the turn signal, and instructs to irradiate light which indicates the vehicle travel direction.

The pair of lamp units 2L and 2R are configured to include a drive circuit 20 and an LED array 21, respectively. The lamp unit 2L is installed on the left side of the front part of the vehicle. The lamp unit 2R is installed on the right side of the front part of the vehicle. Similarly, a pair of lamp units may be installed on the left and right sides of the rear part of the vehicle. For the sake of simplicity, in the present embodiment, only a pair of lamp units 2L and 2R installed at the front of the vehicle will be considered.

The drive circuit 20 provides drive power to each LED (light emitting element) included in the LED array 21, and lights on and off each LED.

The LED array 21 has a plurality of LEDs, and each LED is made to emit light by the drive power provided from the drive circuit 20.

Figure 2:
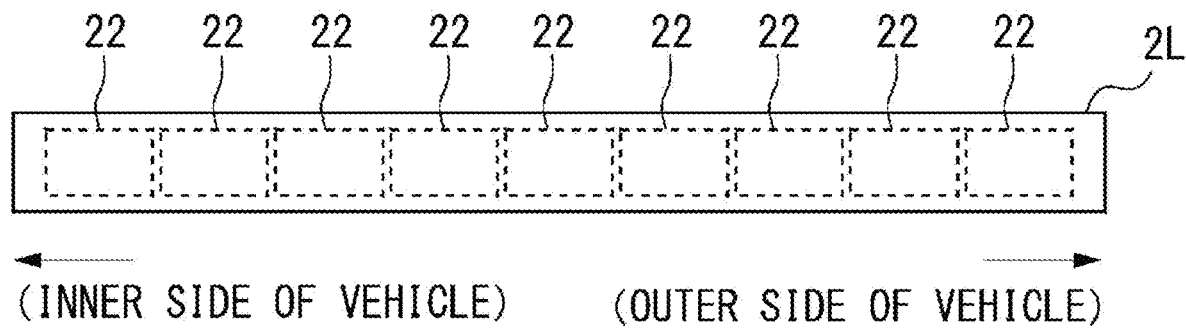
FIG. 2 is a plan view showing an external configuration of the lamp unit.

FIG. 2 is a plan view showing an external configuration of the lamp unit. Although only the lamp unit 2L is shown here, the lamp unit 2R is bilaterally symmetrical and has the same configuration. As shown in the figure, the lamp unit 2L has a plurality of light emitting units 22 (nine in the illustrated example) arranged from the inner side (center side) of the vehicle to the outer side of the vehicle. Each light emitting unit 22 is associated with one or more LEDs included in the LED array 21, and can be individually lighted on and off by the control of the drive circuit 20, and its brightness (luminance) can be set freely. In the following, for convenience of explanation, it is assumed that one LED is associated with each light emitting unit 22.

Figure 3:
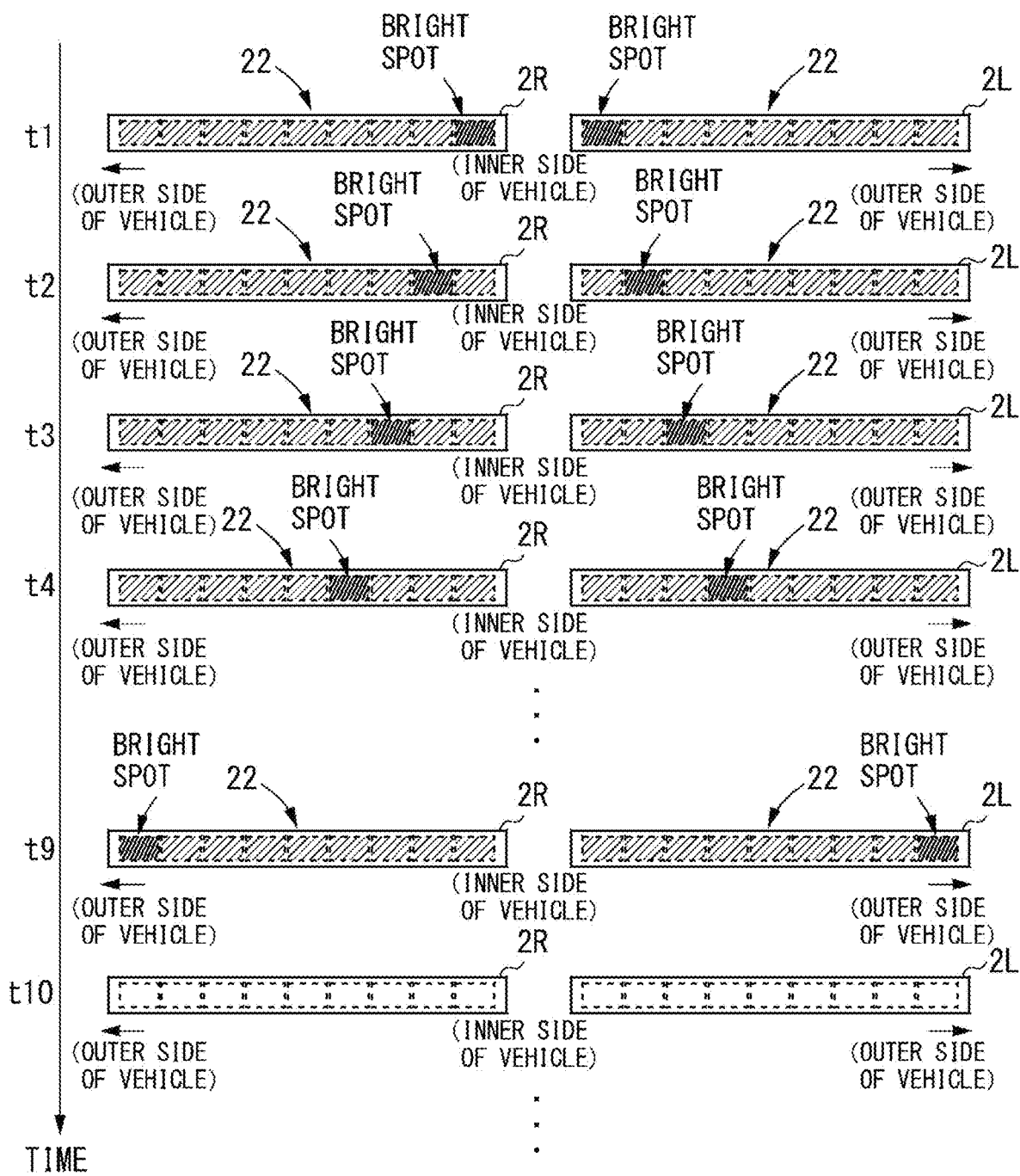
FIG. 3 is a diagram for explaining an operating state of the vehicular lamp system of the present embodiment.

FIG. 3 is a diagram for explaining an operating state of the vehicular lamp system of the present embodiment. Here, the operating state of the lamp units 2L and 2R are shown side by side, but at the time of actual operation, either one of the lamp units 2L or 2R operates according to the traveling direction to be indicated. Hereinafter, the lamp unit 2L will be described, but note that the lamp unit 2R also operates in the same manner.

When the turn signal is input, at time t1, except for one of the light emitting unit 22 of the lamp unit 2L at the inner side of the vehicle, each LED corresponding to each light emitting unit 22 is driven by a rated current, and from each light emitting unit 22, light with a first luminance is emitted. Here, since the luminance of the corresponding LED in each light emitting unit 22 may vary, the above-described "first luminance" does not necessarily need be a constant value, and for example, luminance within an error range of about ±10% is allowable.

At the above-described time t1, the LED corresponding to the innermost light emitting unit 22 is temporarily driven with a current higher than the rated current, and this light emitting unit 22 emits light with a second luminance which is higher than the first luminance. As a result, a bright spot which is a region with a higher luminance than the other light emitting units 22 is formed at a position corresponding to one of the light emitting unit 22 at the innermost side of the vehicle.

At the next time t2, the drive current of the LED corresponding to the innermost light emitting unit 22 is returned to the rated current, and light is emitted with the first luminance from this light emitting unit 22. Further, at this time t2, the second innermost light emitting unit 22 is temporarily driven with a current higher than the rated current, and light is emitted from the light emitting unit 22 with the second luminance which is higher than the first luminance. As a result, a bright spot which is a region with a higher luminance than the other light emitting units 22 is formed at a position corresponding to one of the light emitting unit 22 at the second innermost side of the vehicle.

Similarly, at time t3, t4, . . . , t9, the light emitting unit 22 which is driven by a current higher than the rated current is sequentially switched. As a result, as shown in the figure, the bright spot formed by the emission of light with the second luminance moves sequentially from the inner side of the vehicle to the outer side of the vehicle. After that, for a certain period of time at or after time t10, all light emitting units 22 are lighted off. After the light-off period has elapsed, the next cycle starts, and the operation at and after time t1 is repeated.

Each light emitting unit 22 of the lamp unit 2L maintains a state of emitting light with the first luminance as a whole between time t1 and time t9. Hereinafter, this state is referred to as a base lighting (state). In this way, in a situation where each light emitting unit 22 is in a base lighting state, by sequentially switching the light emitting unit 22 which emits light with the second luminance, the bright spot is sequentially moved. For a certain period of time at or after time t10, all light emitting units 22 are lighted off. By combining these operations, the lamp unit 2L repeatedly blinks (lights on and off) at a fixed interval as a whole, and operates so that the bright spot moves from the inner side of the vehicle to the outer side of the vehicle within the lighting period. That is, it is possible to realize a direction indicator display in which sequential blinking is superimposed on a conventional direction indicator with a simple blinking function.

Here, when a hazard signal is supplied instead of a turn signal, the lamp units 2L and 2R may be operated at the same time by the above-described control method.

Figure 4A:
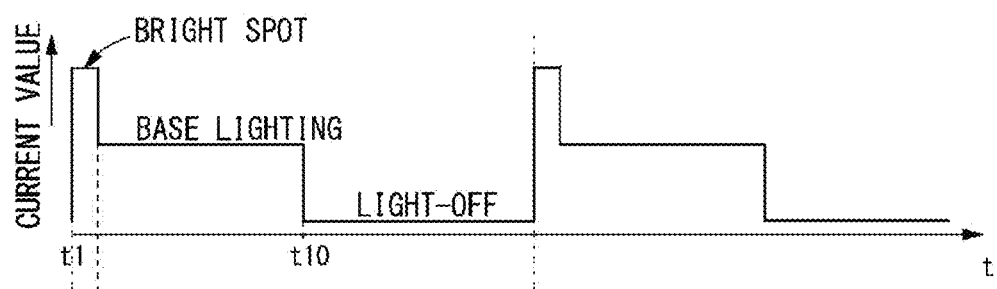
FIGS. 4A to 4D are timing charts showing LED drive current waveforms corresponding to each light emitting unit of the lamp unit.
Figure 4B:
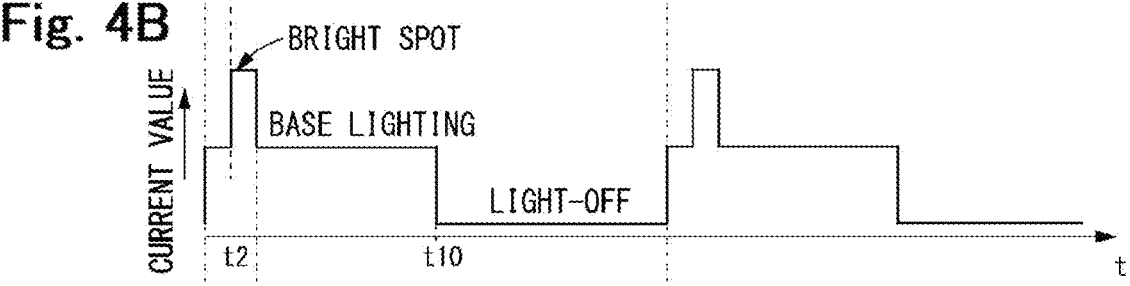
Figure 4C:
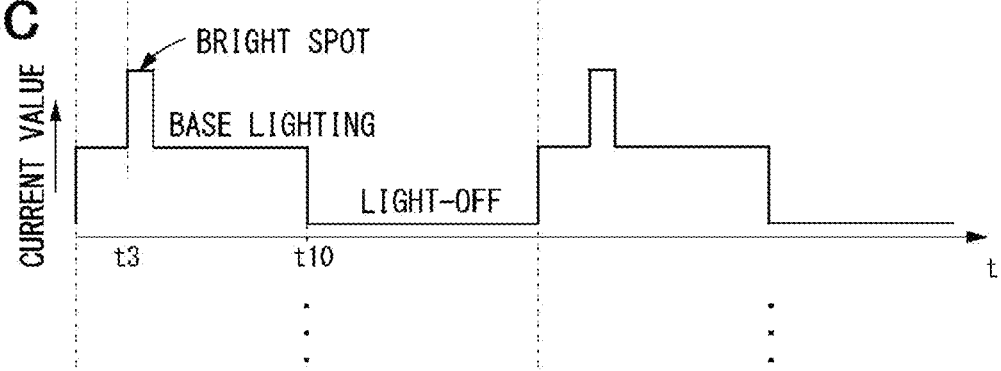
Figure 4D:
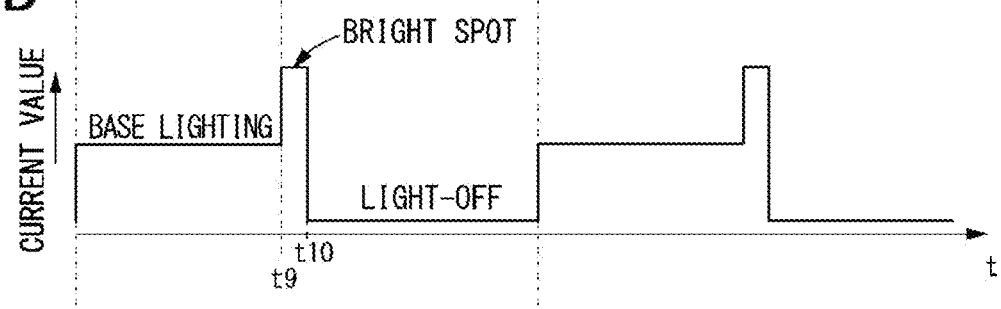

FIGS. 4A to 4D are timing charts showing LED drive current waveforms corresponding to each light emitting unit of the lamp unit. Here, the drive current for the lamp unit 2L will be described, but the same applies to the lamp unit 2R. FIG. 4A is a drive current waveform of the LED corresponding to the innermost light emitting unit 22. FIG. 4B is a drive current waveform of the LED corresponding to the second innermost light emitting unit 22. FIG. 4C is a drive current waveform of the LED corresponding to the third innermost light emitting unit 22. FIG. 4D is a drive current waveform of the LED corresponding to the outermost light emitting unit 22.

As shown in FIG. 4A, at time t1, the drive current of the LED corresponding to the innermost light emitting unit 22 is set higher than the rated current, and this state is maintained until time t2, after which the drive current is returned to the rated current. As a result, during the period from time t1 to t2, the light emitted from the region corresponding to the light emitting unit 22 becomes the second luminance and a bright spot is formed in this region (refer to FIG. 3). At this time, as shown in FIGS. 4B to 4D, since the drive current of the LEDs corresponding to the other light emitting units 22 are set to the rated current, the lights emitted from the regions corresponding to the other light emitting units 22 become the first luminance (base lighting state).

As shown in FIG. 4B, at time t2, the drive current of the LED corresponding to the second innermost light emitting unit 22 is set higher than the rated current, and this state is maintained until time t3, after which the drive current is returned to the rated current. As a result, during the period from time t2 to t3, the light emitted from the region corresponding to the light emitting unit 22 becomes the second luminance and a bright spot is formed in this region (refer to FIG. 3). At this time, as shown in FIG. 4A, FIG. 4C, and FIG. 4D, since the drive current of the LEDs corresponding to the other light emitting units 22 are set to the rated current, the lights emitted from the regions corresponding to the other light emitting units 22 become the first luminance (base lighting state).

As shown in FIG. 4C, at time t3, the drive current of the LED corresponding to the third innermost light emitting unit 22 is set higher than the rated current, and this state is maintained until time t4, after which the drive current is returned to the rated current. As a result, during the period from time t3 to t4, the light emitted from the region corresponding to the light emitting unit 22 becomes the second luminance and a bright spot is formed in this region (refer to FIG. 3). At this time, as shown in FIG. 4A, FIG. 4B, and FIG. 4D, since the drive current of the LEDs corresponding to the other light emitting units 22 are set to the rated current, the lights emitted from the regions corresponding to the other light emitting units 22 become the first luminance value (base lighting state).

The drive current is similarly provided at subsequent time periods. Further, as shown in FIG. 4D, at time t9, the drive current of the LED corresponding to the outermost light emitting unit 22 is set higher than the rated current, and this state is maintained until time t10, after which the drive current is returned to the rated current. As a result, during the period from time t9 to t10, the light emitted from the region corresponding to the light emitting unit 22 becomes the second luminance and a bright spot is formed in this region (refer to FIG. 3). At this time, as shown in FIG. 4A, FIG. 4B, and FIG. 4C, since the drive current of the LEDs corresponding to the other light emitting units 22 are set to the rated current, the lights emitted from the regions corresponding to the other light emitting units 22 become the first luminance (base lighting state).

Thereafter, drive current for all of the light emitting units 22 is turned off, and each light emitting unit 22 becomes a light-off state. The light-off period is set to the same length as the period from time t1 to time t10, for example. Here, the length between a certain time (for example, time t1) and the next time (for example, time t2) is preferably set to about 50 ms, for example. In this case, the lighting period (between time t1 and t10) becomes 500 ms, and the light-off period also becomes 500 ms. Here, note that the above values are merely an example.

Based on the control of the controller 1, by providing drive current from the drive circuit 20 to the LED array 21 as described above, it is possible to realize a direction indicator display in which sequential blinking is superimposed on a conventional direction indicator with a simple blinking function, as shown in FIG. 3.

Figure 5A:
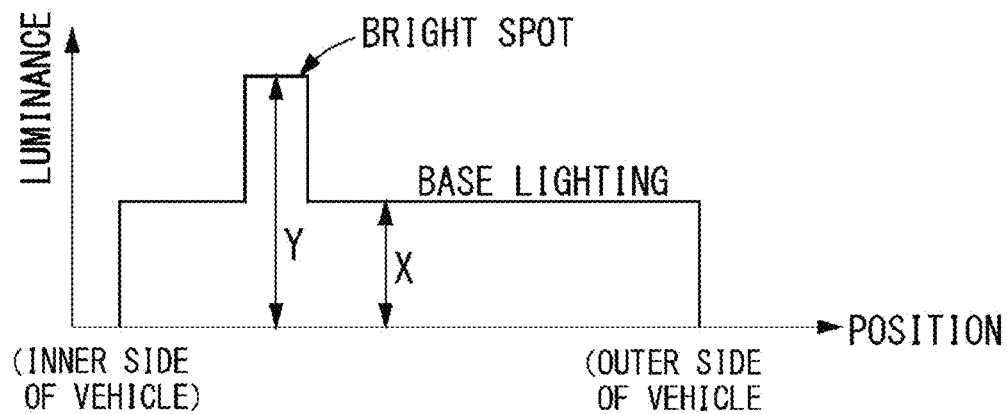
FIG. 5A is a diagram for explaining a preferable luminance value of the bright spot.

FIG. 5A is a diagram for explaining a preferable luminance value of the bright spot. The vertical axis in the figure corresponds to luminance (cd/m$^2$), and the horizontal axis corresponds to the position in the vehicle width direction. As shown in the figure, the luminance (the first luminance) of the light emitting units 22 corresponding to each region in a base lighting state are defined as X, and the luminance (second luminance) of the light emitting unit 22 corresponding to the region which becomes the bright spot is defined as Y. Here, it is preferable that Y is set to be greater than 1.2 times of X, more preferably set to be greater than 1.5 times of X, and further preferably set to be greater than 1.7 times of X. By setting the bright spot with such a luminance ratio, the visibility of the bright spot can be further improved.

Figure 5B:
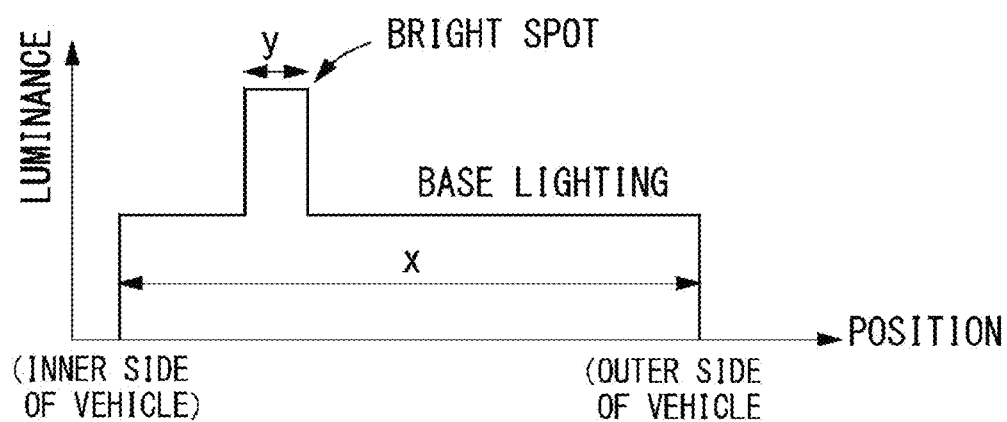
FIG. 5B is a diagram for explaining a preferable width value of the bright spot.

FIG. 5B is a diagram for explaining a preferable width value of the bright spot. The vertical axis in the figure corresponds to luminance (cd/m$^2$), and the horizontal axis corresponds to the position of the vehicle width direction. As shown in the figure, the width of each region in a base lighting state is defined as X, and the width of the region which becomes the bright spot is defined as Y. Here, it is preferable that Y is set to be smaller than ½ of X, more preferably set to be smaller than ⅓ of X, and further preferably set to be smaller than ⅕ of X. By setting the bright spot with such a width ratio, the visibility of the bright spot can be further improved.

Figure 5C:
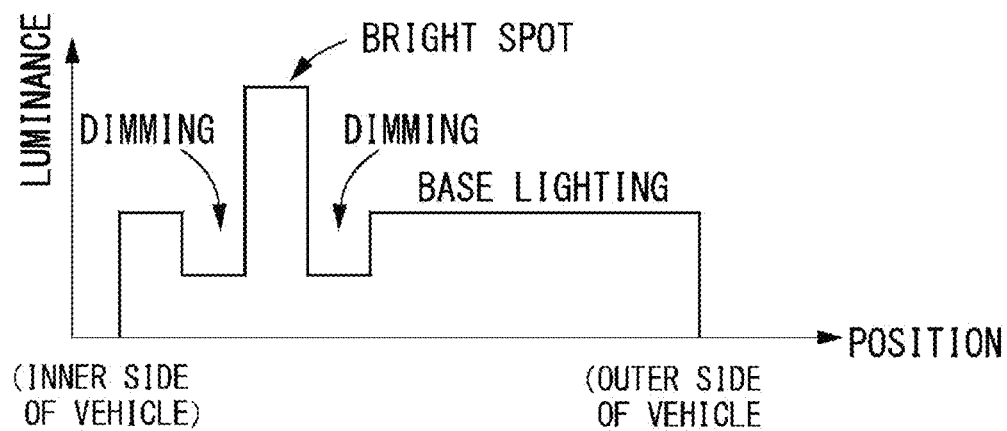
FIG. 5C is a diagram for explaining a modified example of the bright spot.

FIG. 5C is a diagram for explaining a modified example of the bright spot. The vertical axis in the figure corresponds to luminance (cd/m$^2$), and the horizontal axis corresponds to the position of the vehicle width direction. As shown in the figure, dimming regions may be provided on both sides (or any one side) of the bright spot region with a luminance lower than the luminance of the light emitting regions which are in a base lighting state. In this case, the drive current in these regions may be set low. With regard to dimming, the light may either be lighted off or the luminance may only be lowered. By setting such dimming regions, the visibility of the bright spot can be further improved.

Figure 6A:
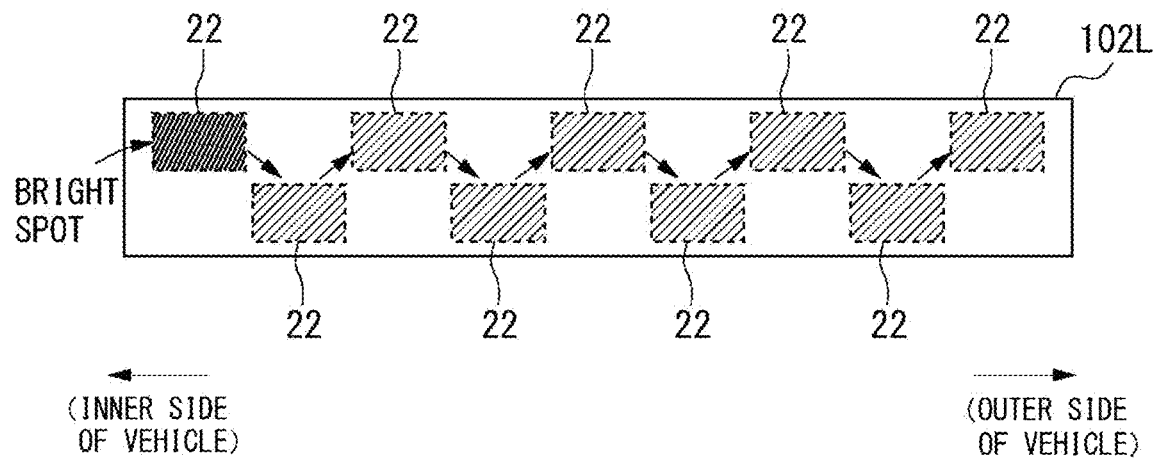
FIGS. 6A and 6B are diagrams for explaining a modified example of the lamp unit.
Figure 6B:
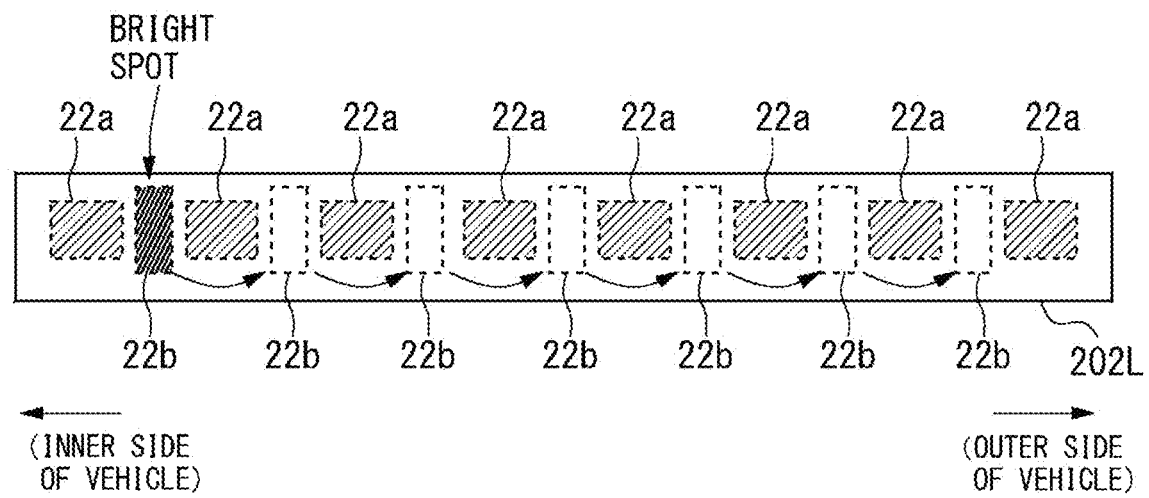

FIGS. 6A and 6B are diagrams for explaining a modified example of the lamp unit. In the modified example lamp unit 102L shown in FIG. 6A, each of the light emitting units 22 are not arranged in a line but are arranged in a zigzag manner. In this lamp unit 102L, along with the arrangement of each light emitting unit 22, the bright spot also moves in a zigzag manner, but the bright spot moves from the inner side of the vehicle to the outer side of the vehicle as a whole. Further, the modified example lamp unit 202L shown in FIG. 6B includes a plurality of first light emitting units 22a arranged in one direction (left-right direction in the figure) and a plurality of second light emitting units 22b each arranged between the first light emitting units 22a and arranged intermittently as a whole. Each first light emitting unit 22a constitutes a first optical system, and each second light emitting unit 22b constitutes a second optical system and are driven separately. In this lamp unit 202L, each first light emitting unit 22a continues to irradiate light with the first luminance, and each second light emitting unit 22b is sequentially lighted on. As a result, within the light emitting region in a base lighting state as a whole, the bright spot moves from the inner side of the vehicle to the outer side of the vehicle.

Here, in the description so far, a plurality of light emitting units arranged in the vehicle width direction has been exemplified, but the arranging direction of each light emitting unit is not limited thereto. For example, each light emitting unit may be arranged from the lower side of the vehicle toward the upper side of the vehicle, or may be arranged in an oblique direction, or may be arranged in combination of a plurality of arranging directions. According to these, the bright spot can be moved from the lower side of the vehicle to the upper side of the vehicle, or the bright spot can be moved in an oblique direction, or the bright spot can be moved in combination of a plurality of arranging directions. Further, the shape and area of each light emitting unit do not necessarily have to be the same.

According to the above embodiments, since it is possible to realize a direction indicator display in which sequential blinking is superimposed on a direction indicator with a simple blinking function, a sense of discomfort during sequential blinking can be reduced.

Further, since the movement of the bright spot is a so-called apparent movement, it is possible to further increase awareness and conspicuity toward the direction indicator display without raising the luminance too high with respect to the regions in a base lighting state. That is, visibility of the luminance can be improved without increasing the drive current too much. Furthermore, by moving the bright spot, it is possible to increase the momentary awareness from all viewing angles and realize a new appearance with a good impression.

Further, since all the regions except for the region corresponding to the bright spot are lighted on at the same time in a base lighting state, it is possible to instantly verify the light-on state from all viewing angles within the light distribution range as compared with the conventional sequential turn lamp. Thus, for example, even when a portion of a lamp unit is blocked by a shielding object (for example, a motorcycle), the turn lamp can be easily verified.

Further, since the regions in a base lighting state are lighted on and off as a whole, the whole lamp including each light emitting unit is recognized as one group. This stems from the law of common fate in Gestalt psychology. Since the bright spot is moved (apparent movement) within the region recognized as one group, the movement of the bright spot does not interfere with the recognition of blinking of the whole group.

Here, the present invention is not limited to the contents of the above-described embodiments, and can be variously modified and implemented within the scope of the gist of the present invention. For example, in the above-described embodiment, rise timing of the base lighting state and rise timing of the first bright spot are set at the same timing, but the two may be set to be different. Similarly, fall timing of the base lighting state and fall timing of the last bright spot are set at the same timing, but the two may be set to be different. Further, the repeating cycle of the bright spot movement and the repeating cycle of the base lighting state do not have to be the same.

Further, the moving speed of the bright spot does not have to be constant, and may be gradually increased, or may be gradually decreased, or may be irregularly changed, for example. Further, the number of the bright spot formed at a certain time is not limited to one, and two or more bright spots may be formed and moved at the same time. Further, the area and shape of the bright spot do not have to be constant, and the area may be gradually increased or the area may be gradually decreased, or the area and/or the shape may be changed irregularly, for example.

Further, in the above-described embodiments, cases where the bright spot is moved within the light emitting region in a base lighting state has been described, but a dark spot may be moved instead of the bright spot by a similar control.

Figure 7:
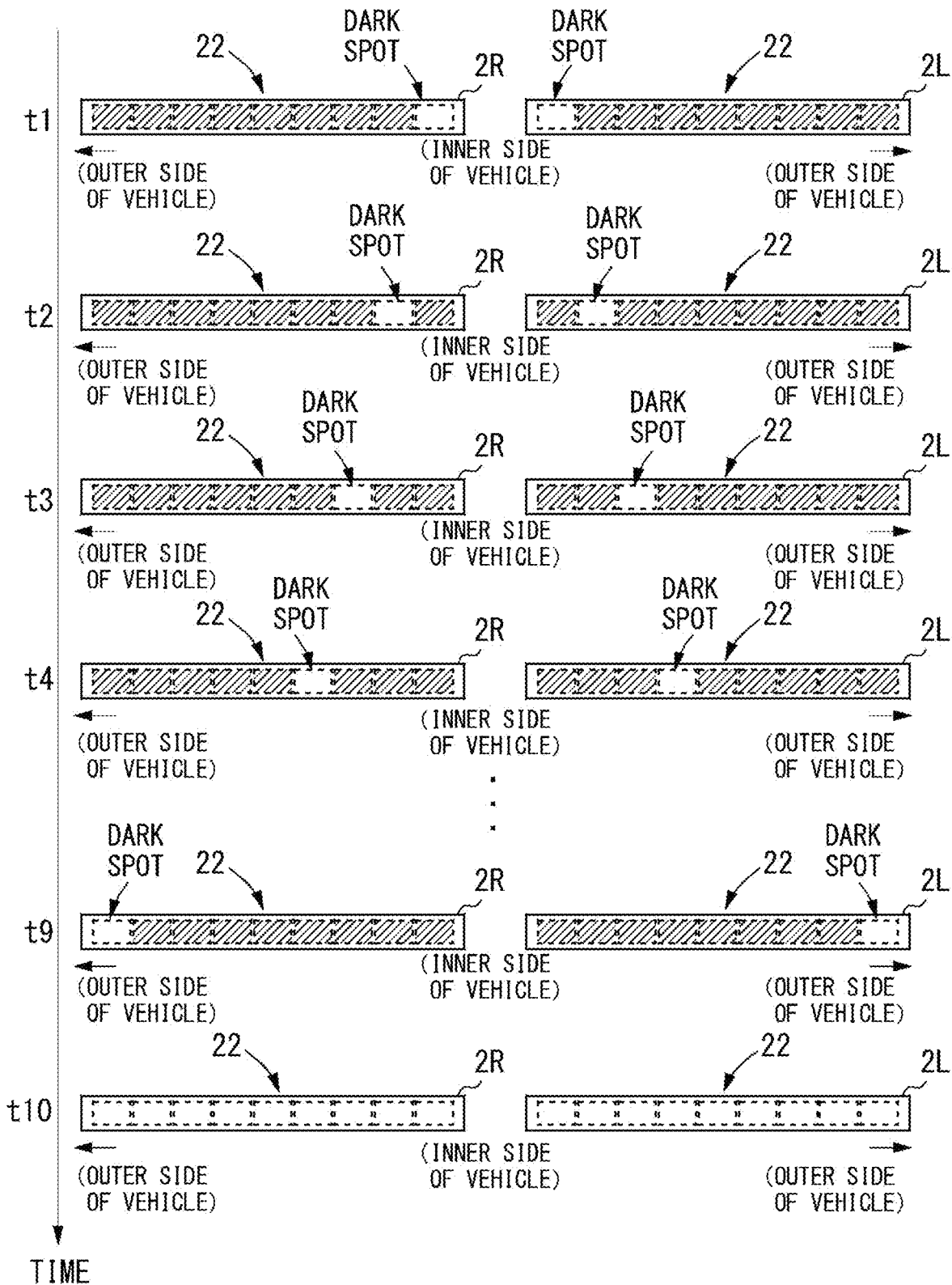
FIG. 7 is a diagram for explaining an operating state of a modified example of the vehicular lamp system.

FIG. 7 is a diagram for explaining an operating state of a modified example of the vehicular lamp system. Here, the operating state of the lamp units 2L and 2R are shown side by side, but at the time of actual operation, either one of the lamp units 2L or 2R operates according to the traveling direction to be indicated. As shown in the illustrated example, instead of the bright spot in the above-described embodiment, a dark spot (region of the third luminance which is lower than the first luminance) is controlled so as to move sequentially with lapse of time.

Figure 8A:
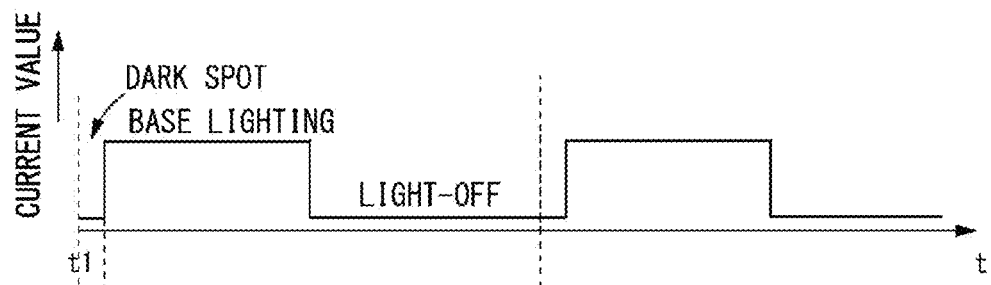
FIGS. 8A to 8D are timing charts showing LED drive current waveforms corresponding to each light emitting unit of the lamp unit in the modified example in which the dark spot is moved.
Figure 8B:
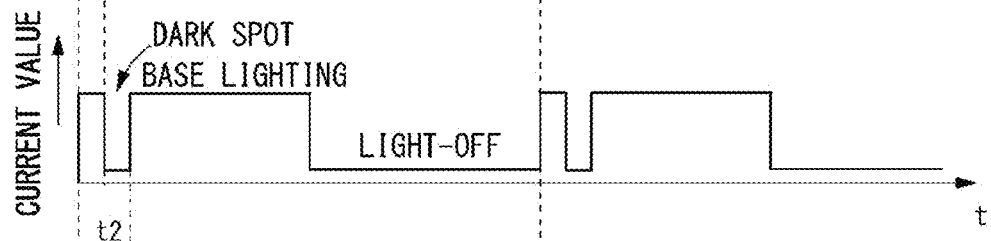
Figure 8C:
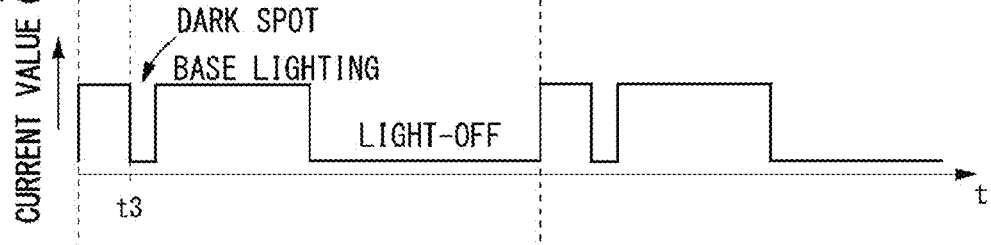
Figure 8D:
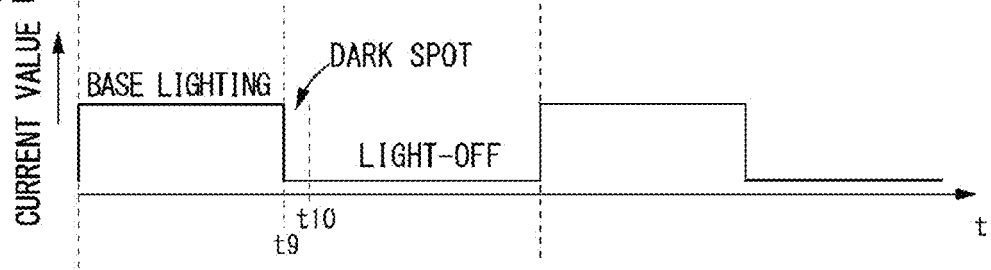

FIGS. 8A to 8D are timing charts showing LED drive current waveforms corresponding to each light emitting unit of the lamp unit in the modified example in which the dark spot is moved. Here, the drive current for the lamp unit 2L will be described, but the same applies to the lamp unit 2R. FIG. 8A is a drive current waveform of the LED corresponding to the innermost light emitting unit 22. FIG. 8B is a drive current waveform of the LED corresponding to the second innermost light emitting unit 22. FIG. 8C is a drive current waveform of the LED corresponding to the third innermost light emitting unit 22. FIG. 8D is a drive current waveform of the LED corresponding to the outermost light emitting unit 22. As shown in each figure, in the case of the bright spot, the drive current has been set to be greater than the rated current, whereas, in the case of the dark spot, the drive current is temporarily set to be smaller than the rated current. In the illustrated example, the drive current of the dark spot has the same magnitude as when the light is off, but the magnitude of the drive current of the two may be different.

Based on the control of the controller 1, by providing drive current from the drive circuit 20 to the LED array 21 as described above, it is possible to realize a direction indicator display in which sequential blinking is superimposed on a conventional direction indicator with a simple blinking function as shown in FIG. 7, where a dark spot is moved instead of a bright spot.

Here, when replacing a bright spot with a dark spot, based on the same concept as the luminance setting shown in FIG. 5C which is described above, the luminance of the regions on both sides (or one side) of the dark spot may be set to be relatively greater. Thereby, the visibility of the dark spot can be further improved.

Further, in the above-described embodiments, cases where the present invention is applied to a vehicular lamp system which is used as a turn lamp has been exemplified, but the scope of application of the present invention is not limited thereto, and the present invention can be applied to various vehicular lamp systems mounted on a vehicle and irradiate light to the surrounding area.

DESCRIPTION OF REFERENCE NUMERALS

1: Controller
2L, 2R, 102L, 102R, 202L, 202R: Lamp unit (Vehicular lamp)
20: Drive circuit
21: LED array
22, 22a, 22b: Light emitting unit

The invention claimed is:
1. A method for controlling a vehicular lamp having a plurality of first light emitting units and a plurality of second light emitting units each of which is intermittently arranged between the first light emitting units, to control lighting of the vehicular lamp, comprising:
controlling the plurality of first light emitting units and the plurality of second light emitting units so as to repeat a lighting period and a light-off period at fixed time intervals;
wherein the lighting controller is configured to control, during each lighting period,
controlling the plurality of first light emitting units, wherein the plurality of first light emitting units are continuously lit at a first light intensity during the lighting period;

moving in a predetermined direction either one or more bright spots having a fixed area temporarily being provided with a second light intensity that is higher than the first light intensity in at least one of a second light emitting unit among the plurality of second light emitting units or one or more dark spots having a fixed area temporarily being provided with a third light intensity that is lower than the first light intensity in at least one of the second light emitting unit among the plurality of second light emitting units;

during each light-off period, turning off all of the plurality of first light emitting units and the plurality of second light emitting units; and repeating blinking at the fixed time intervals based on an indicated direction, the vehicular lamp being a direction indicator lamp, and operating so that the bright spots or the dark spots move during the lighting period.

2. The method according to claim 1, wherein the first light intensity is a light intensity which corresponds to a rated current of each of the plurality of light emitting units.

3. The method according to claim 1, wherein the predetermined direction is either a direction from the inner side to the outer side of a vehicle, a direction from the outer side to the inner side of the vehicle, a direction from the bottom to the top of the vehicle, a direction from the top to the bottom of the vehicle, or a direction that combines two or more of said directions.

4. The method according to claim 1, wherein the second light intensity is set to be higher than 1.2 times of the first light intensity.

5. The method according to claim 1, wherein the width of the one or more bright spots are set to be smaller than ½ of the width of the light emitting region with the first light intensity.

* * * * *